(12) United States Patent
Li

(10) Patent No.: US 10,869,189 B2
(45) Date of Patent: Dec. 15, 2020

(54) IP ADDRESS ASSIGNMENT METHOD AND APPARATUS

(71) Applicant: HUAWEI TECHNOLOGIES CO., LTD., Shenzhen (CN)

(72) Inventor: Yan Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/865,278

(22) Filed: Jan. 9, 2018

(65) Prior Publication Data
US 2018/0132099 A1 May 10, 2018

Related U.S. Application Data

(63) Continuation of application No. PCT/CN2015/083986, filed on Jul. 14, 2015.

(51) Int. Cl.
H04W 8/26 (2009.01)
H04L 29/12 (2006.01)
H04W 76/12 (2018.01)
H04W 84/04 (2009.01)

(52) U.S. Cl.
CPC ............ *H04W 8/26* (2013.01); *H04L 61/2007* (2013.01); *H04L 61/2015* (2013.01); *H04W 76/12* (2018.02); *H04W 84/042* (2013.01)

(58) Field of Classification Search
CPC ..... H04W 8/26; H04W 84/042; H04W 76/12; H04L 61/2015; H04L 61/2007
See application file for complete search history.

(56) References Cited

U.S. PATENT DOCUMENTS 9,807,819 B1 * 10/2017 Zhu .................... H04W 92/02
2010/0136970 A1 * 6/2010 Mui ..................... H04L 65/1073
455/435.1
(Continued)

FOREIGN PATENT DOCUMENTS

CN 101841790 A 9/2010
CN 103634853 A 3/2014
(Continued)

OTHER PUBLICATIONS

ETSI TS 123 401 V9.2.0, "LTE; General Packet Radio Service (GPRS) enhancements for Evolved Universal Terrestrial Radio Access Network (E-UTRAN) access (3GPP TS 23.401 version 9.2.0 Release 9)", Oct. 14, 2009, 247 pages, XP014336911.

*Primary Examiner* — Christine Ng
(74) *Attorney, Agent, or Firm* — Kilpatrick Townsend & Stockton LLP

(57) ABSTRACT

Embodiments of the present invention provide an IP address assignment method and apparatus, and relate to the communications field, so that a terminal can more easily and conveniently select a proper IP address to initiate a service, thereby avoiding a problem that the terminal needs to adapt to different operators due to APN list maintenance. The IP address assignment method includes: sending, by an IP address assignment apparatus, an IP address and a mobility attribute of the IP address to UE; and selecting, by the UE, an IP address corresponding to a mobility requirement of the UE to initiate a service. The present invention is applied to IP address assignment.

17 Claims, 7 Drawing Sheets

(56) References Cited

U.S. PATENT DOCUMENTS

| | | | |
|---|---|---|---|
| 2010/0172239 A1* | 7/2010 | Corliano | H04L 45/04 370/230 |
| 2010/0202375 A1 | 8/2010 | Rydnell et al. | |
| 2013/0155937 A1* | 6/2013 | Aramoto | H04L 12/2838 370/312 |
| 2014/0226668 A1 | 8/2014 | Choi et al. | |
| 2014/0328317 A1* | 11/2014 | Park | H04W 8/26 370/331 |
| 2015/0029956 A1* | 1/2015 | Moses | H04B 7/0686 370/329 |
| 2015/0110095 A1 | 4/2015 | Tan et al. | |
| 2015/0230151 A1 | 8/2015 | Muhanna et al. | |
| 2015/0256561 A1 | 9/2015 | Zhou | |
| 2016/0191631 A1* | 6/2016 | Haraszti | H04L 67/14 709/227 |
| 2016/0255540 A1* | 9/2016 | Kweon | H04W 76/15 370/237 |

FOREIGN PATENT DOCUMENTS

| | | |
|---|---|---|
| CN | 103636283 A | 3/2014 |
| RU | 2474069 C2 | 1/2009 |
| RU | 2518197 C2 | 6/2014 |
| WO | 2010011740 A3 | 5/2010 |
| WO | 2013177954 A1 | 12/2013 |
| WO | 2014056374 A1 | 4/2014 |
| WO | 2015013567 A1 | 1/2015 |
| WO | 2015057034 A1 | 4/2015 |

\* cited by examiner

IP ADDRESS ASSIGNMENT METHOD AND APPARATUS

CROSS-REFERENCE TO RELATED APPLICATIONS

This application is a continuation of International Application No. PCT/CN2015/083986, filed on Jul. 14, 2015, the disclosure of which is hereby incorporated by reference in its entirety.

TECHNICAL FIELD

The present invention relates to the communications field, and in particular, to an IP address assignment method and apparatus.

BACKGROUND

In an evolved packet system architecture that is developed at 3GPP Release R8 stage, a packet data network gateway (PGW) assigns an IP address. To ensure user IP address continuity, a PGW deployment location is of a relatively high level. For example, in China, a PGW is usually deployed in a provincial capital. In this way, when a user moves, the user can always connect to the PGW to ensure that an IP address assigned to the user is unchanged. However, in practical application, a user often visits local service servers (for example, in China, these servers are located in a prefectural-level city). If the user still connects to the PGW, route recurvation occurs. That is, user traffic goes to a PGW of a provincial capital first, and then returns to a local server of a prefectural-level city. This prolongs a packet transmission delay, affects user experience, and wastes transmission bandwidth between the provincial capital and the prefectural-level city.

To resolve this problem, 3GPP further defines a Selected IP Traffic Offload (SIPTO) function. A core idea of the SIPTO function is to deploy an SGW and a local packet data network gateway (LPGW) near a location (for example, a prefectural-level city) at which a user accesses a network. When the user visits the local server, the LPGW assigns an IP address to the user, and traffic passes only through the LPGW. This avoids various problems caused by route recurvation. An LPGW is at a relatively low-level location. Therefore, when moving to a management area of an LPGW, a user usually releases an IP address of the user, and selects the LPGW. Therefore, an IP address assigned by the LPGW does not ensure session continuity of the user. An application on a user terminal needs to select, according to a requirement of the application, different IP addresses to initiate a service.

In a related technology for selecting an IP address, the user terminal maintains access point name (APN) lists of different operators and attributes corresponding to the lists. In this way, the application on the user terminal may select, according to the requirement of the application and a connected operator, IP addresses corresponding to different APNs to initiate a service.

However, there are a large quantity of operator APN lists due to a large quantity of mobile operators throughout the world. Consequently, for example, too much terminal memory is occupied to maintain the APN lists. In addition, with the rise of virtual network operators, a quantity of mobile operators dynamically increases. Each time one operator is added, the APN lists need to be dynamically modified. This requires the terminal to frequently update the APN lists. However, the APN lists cannot be updated in time. Therefore, if a mobile phone user selects a new operator, but the lists are not updated, the user cannot select a proper IP address to initiate a service.

SUMMARY

The present invention provides an IP address assignment method, so that a terminal can more easily and conveniently select a proper IP address to initiate a service, thereby avoiding a problem that the terminal needs to adapt to different operators due to APN list maintenance.

According to a first aspect, an IP address assignment method is provided. The method includes:

sending, by an IP address assignment apparatus, an IP address and a mobility attribute of the IP address to UE; and selecting, by the UE, an IP address corresponding to a mobility requirement of the UE to initiate a service.

With reference to the first aspect, in a first possible implementation, before the sending, by an IP address assignment apparatus, an IP address and a mobility attribute of the IP address to the UE, the method further includes:

sending, by the UE, an attach request message or a PDN connection establishment request message to an MME; and determining, by the MME, an IP address mobility attribute of the UE based on the attach request message or the PDN connection establishment request message, selecting an IP address assignment apparatus corresponding to the IP address mobility attribute, and sending a create session request message to the IP address assignment apparatus; and the sending, by an IP address assignment apparatus, an IP address and a mobility attribute of the IP address to the UE includes:

after receiving the create session request message from the MME, sending, by the IP address assignment apparatus, a create session response message to the MME, where the create session response message includes the IP address and the mobility attribute of the IP address; and returning, by the MME, an attach accept message or the PDN connection establishment request message to the UE via a base station, where the attach accept message or the PDN connection establishment request includes the IP address and the mobility attribute of the IP address.

With reference to the first possible implementation of the first aspect, in a second possible implementation, the attach request message includes mobility preference information of the UE, and/or the PDN connection establishment request message includes mobility preference information of the UE, so that the MME determines the mobility attribute according to the mobility preference information.

With reference to any one of the foregoing possible implementations of the first aspect, in a third possible implementation, the IP address assignment apparatus is a PGW, and an IP address mobility attribute corresponding to the PGW is mobility provided, or the IP address assignment apparatus is an LPGW, and an IP address mobility attribute corresponding to the LPGW is mobility not provided.

With reference to the first aspect, in a fourth possible implementation, the IP address assignment apparatus is integrated into a converged control function CCF; and before the sending, by an IP address assignment apparatus, an IP address and a mobility attribute of the IP address to the UE, the method further includes:

sending, by the UE, an IP address request message to the CCF, and determining, by the CCF, an IP address mobility attribute of the UE and selecting a corresponding forwarding apparatus according to the IP address mobility attribute of the UE; and delivering, by the CCF, a forwarding rule to the selected forwarding apparatus, so that the forwarding apparatus processes, according to the forwarding rule, an IP packet that is corresponding to the mobility attribute and that is sent by the UE; and the sending, by an IP address assignment apparatus, an IP address and a mobility attribute of the IP address to the UE includes:

returning, by the CCF, an IP address response message to the UE, where the IP address response message includes the IP address and the mobility attribute of the IP address.

With reference to the fourth possible implementation of the first aspect, in a fifth possible implementation, the IP address request message is an attach request message or a PDN connection establishment request message, and the IP address response message is an attach response message or a PDN connection establishment response message.

With reference to the fourth possible implementation of the first aspect, in a sixth possible implementation, the IP address request message is a DHCP request message or a router request, and the IP address response message is a DHCP response message or a router advertisement message.

With reference to the sixth possible implementation of the first aspect, in a seventh possible implementation, after the returning, by the CCF, a DHCP response message or a router advertisement message to the UE, the method further includes:

sending, by the CCF, a bearer setup request message to a base station, and sending a session management request message to the UE via the base station, where the session management request message includes traffic flow template TFT information;

sending, by the base station, a bearer setup response message to the CCF; and transmitting, by the UE, an IP packet that matches the TFT information to the forwarding apparatus.

With reference to the fourth possible implementation of the first aspect, in an eighth possible implementation, the IP address request message includes mobility preference information of the UE, and the CCF determines the IP address mobility attribute of the UE according to the mobility preference information of the UE.

With reference to the fourth or eighth possible implementation of the first aspect, in a ninth possible implementation, the IP address mobility attribute includes mobility provided and mobility not provided, the forwarding apparatus includes a first forwarding apparatus corresponding to mobility provided and a second forwarding apparatus corresponding to mobility not provided.

According to a second aspect, an IP address assignment method is provided. The method includes:

receiving, by UE, an IP address and a mobility attribute of the IP address that are assigned by an IP address assignment apparatus; and selecting, by the UE, an IP address corresponding to a mobility requirement of the UE to initiate a service.

With reference to the second aspect, in a first possible implementation, before the receiving, by UE, an IP address and a mobility attribute of the IP address that are assigned by an IP address assignment apparatus, the method further includes:

sending, by the UE, an attach request message or a PDN connection establishment request message to an MME; and receiving, by the UE, an attach accept message or the PDN connection establishment request message returned by the MME via a base station, where the attach accept message or the PDN connection establishment request message includes the IP address and the mobility attribute of the IP address.

With reference to the first possible implementation of the second aspect, in a second possible implementation, the attach request message includes mobility preference information of the UE, and/or the PDN connection establishment request message includes mobility preference information of the UE, so that the MME determines the mobility attribute according to the mobility preference information.

With reference to the second aspect, in a third possible implementation, the IP address assignment apparatus includes a first IP address assignment apparatus and a second IP address assignment apparatus; and the receiving, by UE, an IP address and a mobility attribute of the IP address that are assigned by an IP address assignment apparatus includes:

receiving, by the UE, an IP address and a mobility attribute of the IP address that are assigned by the first IP address assignment apparatus and/or the second IP address assignment apparatus, where the mobility attribute of the IP address includes mobility provided and mobility not provided, mobility provided is corresponding to the first IP address assignment apparatus, and mobility not provided is corresponding to the second IP address assignment apparatus.

With reference to the second aspect, in a fourth possible implementation, the IP address assignment apparatus is integrated into a converged control function CCF; and before the receiving, by UE, an IP address and a mobility attribute of the IP address that are assigned by an IP address assignment apparatus, the method further includes:

sending, by the UE, an IP address request message to the CCF; and receiving, by the UE, an IP address response message returned by the CCF, where the IP address response message includes the IP address and the mobility attribute of the IP address.

With reference to the fourth implementation of the second aspect, in a fifth possible implementation, the IP address request message is an attach request message or a PDN connection establishment request message, and the IP address response message is an attach response message or a PDN connection establishment response message.

With reference to the fourth implementation of the second aspect, in a sixth possible implementation, the IP address request message is a DHCP request message or a router request, and the IP address response message is a DHCP response message or a router advertisement message.

With reference to the sixth implementation of the second aspect, in a seventh possible implementation, after the receiving, by the UE, a DHCP response message or a router advertisement message returned by the CCF, the method further includes:

receiving, by the UE, a session management request message, where the session management request message includes traffic flow template TFT information; and transmitting, by the UE, an IP packet that matches the TFT information.

With reference to the fourth implementation of the second aspect, in an eighth possible implementation, the IP address request message includes mobility preference information of the UE, so that the CCF determines the IP address mobility attribute of the UE according to the mobility preference information of the UE.

According to a third aspect, a network system for IP address assignment is provided. The network system includes an IP address assignment apparatus and UE, where the IP address assignment apparatus is configured to send an IP address and a mobility attribute of the IP address to the UE; and the UE is configured to select an IP address corresponding to a mobility requirement of the UE to initiate a service.

With reference to the third aspect, in a first possible implementation, the network system further includes an MME, where before the IP address assignment apparatus sends the IP address and the mobility attribute of the IP address to the UE, the UE is further configured to send an attach request message or a PDN connection establishment request message to the MME;

the MME is configured to: determine an IP address mobility attribute of the UE based on the attach request message or the PDN connection establishment request message, select an IP address assignment apparatus corresponding to the IP address mobility attribute, and send a create session request message to the IP address assignment apparatus;

the IP address assignment apparatus is specifically configured to:

after receiving the create session request message from the MME, send a create session response message to the MME, where the create session response message includes the IP address and the mobility attribute of the IP address; and the MME is further configured to return an attach accept message or the PDN connection establishment request message to the UE via a base station, where the attach accept message or the PDN connection establishment request includes the IP address and the mobility attribute of the IP address.

With reference to the first possible implementation of the third aspect, in a second possible implementation, the attach request message includes mobility preference information of the UE, and/or the PDN connection establishment request message includes mobility preference information of the UE; and the MME is further configured to determine the mobility attribute according to the mobility preference information.

With reference to any one of the foregoing implementations of the third aspect, in a third possible implementation, the IP address assignment apparatus is a PGW, and an IP address mobility attribute corresponding to the PGW is mobility provided, or the IP address assignment apparatus is an LPGW, and an IP address mobility attribute corresponding to the LPGW is mobility not provided.

With reference to the third aspect, in a fourth possible implementation, the IP address assignment apparatus is integrated into a converged control function CCF; and before the IP address assignment apparatus sends the IP address and the mobility attribute of the IP address to the UE, the UE is further configured to send an IP address request message to the CCF; the CCF is configured to: determine an IP address mobility attribute of the UE, and select a corresponding forwarding apparatus according to the IP address mobility attribute of the UE;

the CCF is further configured to deliver a forwarding rule to the selected forwarding apparatus, so that the forwarding apparatus processes, according to the forwarding rule, an IP packet that is corresponding to the mobility attribute and that is sent by the UE; and the IP address assignment apparatus is specifically configured to:

return an IP address response message to the UE, where the IP address response message includes the IP address and the mobility attribute of the IP address.

With reference to the fourth possible implementation of the third aspect, in a fifth possible implementation, the IP address request message is an attach request message or a PDN connection establishment request message, and the IP address response message is an attach response message or a PDN connection establishment response message.

With reference to the fourth possible implementation of the third aspect, in a sixth possible implementation, the IP address request message is a DHCP request message or a router request, and the IP address response message is a DHCP response message or a router advertisement message.

With reference to the sixth possible implementation of the third aspect, in a seventh possible implementation, the network system further includes a base station, where after the CCF returns the DHCP response message or the router advertisement message to the UE, the CCF is further configured to: send a bearer setup request message to the base station, and send a session management request message to the UE via the base station, where the session management request message includes traffic flow template TFT information;

the base station sends a bearer setup response message to the CCF; and transmitting, by the UE, an IP packet that matches the TFT information to the forwarding apparatus.

With reference to the fourth possible implementation of the third aspect, in an eighth possible implementation, the IP address request message includes mobility preference information of the UE; and the CCF is further configured to determine the IP address mobility attribute of the UE according to the mobility preference information of the UE.

With reference to the fourth or eighth possible implementation of the third aspect, in a ninth possible implementation, the IP address mobility attribute includes mobility provided and mobility not provided, the forwarding apparatus includes a first forwarding apparatus corresponding to mobility provided and a second forwarding apparatus corresponding to mobility not provided.

According to a fourth aspect, a user equipment UE is provided. The UE includes a receiving module and a processing module, where the receiving module is configured to receive an IP address and a mobility attribute of the IP address that are assigned by an IP address assignment apparatus; and the processing module is configured to select an IP address corresponding to a mobility requirement of the UE to initiate a service.

With reference to the fourth aspect, in a first possible implementation, the UE further includes a sending module, where before the receiving module receives the IP address and the mobility attribute of the IP address that are assigned by the IP address assignment apparatus, the sending module is configured to send an attach request message or a PDN connection establishment request message to an MME; and the receiving module is further configured to receive an attach accept message or the PDN connection establishment request message returned by the MME via a base station, where the attach accept message or the PDN connection establishment request message includes the IP address and the mobility attribute of the IP address.

With reference to the first implementation of the fourth aspect, in a second possible implementation, the attach request message includes mobility preference information of the UE, and/or the PDN connection establishment request message includes mobility preference information of the UE, so that the MME determines the mobility attribute according to the mobility preference information.

With reference to the fourth aspect, in a third possible implementation, the IP address assignment apparatus includes a first IP address assignment apparatus and a second IP address assignment apparatus; and the receiving module is specifically configured to:

receive an IP address and a mobility attribute of the IP address that are assigned by the first IP address assignment apparatus and/or the second IP address assignment apparatus, where the mobility attribute of the IP address includes mobility provided and mobility not provided, mobility provided is corresponding to the first IP address assignment apparatus, and mobility not provided is corresponding to the second IP address assignment apparatus.

With reference to the fourth aspect or the third implementation of the fourth aspect, in a fourth possible implementation, the IP address assignment apparatus is integrated into a converged control function CCF;

before the receiving module receives the IP address and the mobility attribute of the IP address that are assigned by the IP address assignment apparatus, the sending module is further configured to send an IP address request message to the CCF; and the receiving module is configured to receive an IP address response message returned by the CCF, where the IP address response message includes the IP address and the mobility attribute of the P address.

With reference to the fourth implementation of the fourth aspect, in a fifth possible implementation, the IP address request message is an attach request message or a PDN connection establishment request message, and the IP address response message is an attach response message or a PDN connection establishment response message.

With reference to the fourth implementation of the fourth aspect, in a sixth possible implementation, the IP address request message is a DHCP request message or a router request, and the IP address response message is a DHCP response message or a router advertisement message.

With reference to the sixth implementation of the fourth aspect, in a seventh possible implementation, after the receiving module receives the DHCP response message or the router advertisement message returned by the CCF, the receiving module is further configured to receive a session management request message, where the session management request message includes traffic flow template TFT information; and the sending module is further configured to transmit an IP packet that matches the TFT information.

With reference to the fourth implementation of the fourth aspect, in an eighth possible implementation, the IP address request message includes mobility preference information of the UE, so that the CCF determines the IP address mobility attribute of the UE according to the mobility preference information of the UE.

According to the IP address assignment method, the network system and the UE provided in the embodiments of the present invention, a mobility attribute corresponding to an IP address is specified when the IP address is assigned. In this way, a terminal can more easily and conveniently select a proper IP address according to a mobility requirement of the terminal, so as to initiate a service, thereby avoiding a problem that the terminal needs to adapt to different operators due to APN list maintenance.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To better understand the present invention, some related terms in the present invention are explained first below.

A base station may be an evolved NodeB (evolved Node B, eNB) in accordance with the disclosure, configured to implement a wireless-related function.

A mobility management entity (MME) may be responsible for user mobility management, including user context and mobile status management, temporary user identity allocation, and user authentication and authorization.

A serving gateway (S-GW) may be a forwarding plane anchor among 3GPP access networks, terminates an interface to an eNB, and implements UE packet forwarding by using a transmission tunnel between the base station and a packet data network gateway (PGW).

A PGW may be a forwarding plane anchor between a 3GPP access network and a non-3GPP access network, and an interface to an external packet data network (PDN); has an IP address assignment function and a bearer management function; and can establish multiple transmission tunnels between the packet data network gateway and a base station (by using an SGW).

A gateway user plane (GW-U) may have functions such as user packet forwarding, encapsulation, and counting.

A converged control function (CCF) may be integrated with functions of an MME and a gateway control plane. In addition to being responsible for user mobility management, the converged control function has functions such as IP address assignment, selection of a gateway user plane device, bearer management, and generation of a gateway user plane forwarding rule.

In a related technology, different APNs are connected to a same network (for example, the Internet). Gateways that provide IP addresses are different, and corresponding mobility support degrees are different. In this application, a general inter-operator IP mobility attribute is used to select different gateways to provide different mobility support, so as to avoid a problem that configuration of APN lists of different operators on a mobile phone is complex, and the APN lists cannot be dynamically updated in time.

To make the objectives, technical solutions, and advantages of the present invention clearer, the following further describes the embodiments of the present invention in detail with reference to the accompanying drawings.

Figure 1:
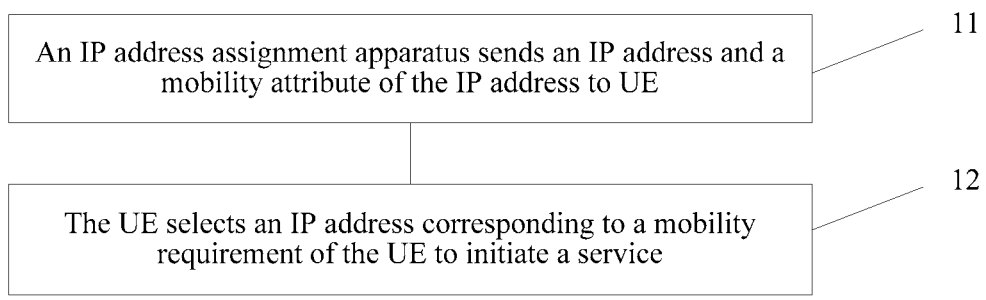
FIG. 1 is a flowchart of an IP address assignment method according to an embodiment of the present invention.

FIG. 1 is a flowchart of an IP address assignment method according to an embodiment of the present invention. Referring to FIG. 1, the IP address assignment method provided in this embodiment of the present invention includes:

11. Sending, by an IP address assignment apparatus, an IP address and a mobility attribute of the IP address to UE.

12. Selecting, by the UE, an IP address corresponding to a mobility requirement of the UE to initiate a service.

The mobility attribute in accordance with the disclosure can indicate when a user moves, whether a network keeps the IP address unchanged, that is, session continuity. The mobility attribute in accordance with the disclosure may include the following two attributes: mobility provided and mobility not provided. Certainly, there may be another classification manner. For example, the mobility attribute is classified into high (that is, corresponding to mobility provided) and low (that is, corresponding to mobility not provided). When mobility is provided or the mobility attribute is high, the IP address remains unchanged. That is, the session continuity is ensured. When the mobility attribute is low or mobility is not provided, the IP address does not remain unchanged. That is, the session continuity is not ensured.

According to the IP address assignment method provided in this embodiment of the present invention, the IP address mobility attribute is general and inter-operator. Therefore, the UE does not need to separately maintain an APN meaning list for each operator, and only needs to record an assigned IP address and an attribute corresponding to the assigned IP address. This simplifies implementation on a mobile phone. When the mobile phone is connected to a new operator, only an IP address assignment process needs to be performed again to update the record, and additional update of an APN service list is unnecessary. This resolves the following problem: An IP address cannot be selected because an APN list in the related technology is not updated in time.

Optionally, in an embodiment in accordance with the present invention, before step 11: sending, at an IP address assignment apparatus, an IP address and a mobility attribute of the IP address to UE, the method further includes:

Sending, by the UE, an attach request message or a PDN connection establishment request message to an MME; and based on the attach request message or the PDN connection establishment request message, determining, by the MME, an IP address mobility attribute of the UE, selects an IP address assignment apparatus corresponding to the IP address mobility attribute, and sends a create session request message to the IP address assignment apparatus.

Correspondingly, step 11 that an IP address assignment apparatus sends an IP address and a mobility attribute of the IP address to UE may include:

After receiving the create session request message from the MME, sending, by the IP address assignment apparatus, a create session response message to the MME, where the create session response message includes the IP address and the mobility attribute of the IP address; and returning, by the UE, an attach accept message or the PDN connection establishment request message to the UE via a base station, where the attach accept message or the PDN connection establishment request includes the IP address and the mobility attribute of the IP address.

The attach request message may includes mobility preference information of the UE, and/or the PDN connection establishment request message may include mobility preference information of the UE. In this way, the MME can determine the mobility attribute according to the mobility preference information.

The IP address assignment method provided in this embodiment in accordance with the present invention may be applied to an EPS network. When the IP address assignment method is applied to the EPS network, the IP address assignment apparatus may be a PGW or an LPGW.

When the IP address assignment apparatus is the PGW, an IP address mobility attribute corresponding to the PGW is mobility provided. When the IP address assignment apparatus is the LPGW, an IP address mobility attribute corresponding to the LPGW is mobility not provided.

Optionally, in an embodiment of the present invention, the IP address assignment apparatus may include multiple IP address assignment apparatuses. For example, the IP address assignment apparatus may include a first IP address assignment apparatus and a second IP address assignment apparatus. The first IP address assignment apparatus and the second IP address assignment apparatus respectively assigned a first IP address and a mobility attribute corresponding to the first IP address, and a second IP address and a mobility attribute corresponding to the second IP address to the UE. The mobility attribute assigned by the first IP address assignment apparatus may be different from the mobility attribute assigned by the second IP address assignment apparatus. For example, in this embodiment in accordance with the present invention, the first IP address assignment apparatus may be a PGW (mobility provided), and the second IP address assignment apparatus may be an LPGW (mobility not provided). Alternatively, the first IP address assignment apparatus may be an LPGW (mobility not provided), and the second IP address assignment apparatus may be a PGW (mobility provided).

In this embodiment of the present invention, when the IP address assignment apparatus includes the first IP address assignment apparatus and the second IP address assignment apparatus, the attach request message may include the mobility preference information of the UE, and is sent to the MME; and the PDN connection establishment request message may also include the mobility preference information of the UE, and is sent to the MME. In this way, the MME can select a corresponding gateway more conveniently according to the received mobility preference information of the UE.

In another embodiment of the present invention, the IP address assignment method provided in this embodiment of the present invention may be applied to a network architecture in which a control plane is separated from a user plane.

In this network architecture, the IP address assignment apparatus is integrated into a CCF. The IP address assignment method provided in this embodiment of the present invention includes the foregoing step 11 and step 12, and before step 11: sending, at an IP address assignment apparatus, an IP address and a mobility attribute of the IP address to UE, the method may further include:

Sending, by the UE, an IP address request message to the CCF, and the determining, by the CCF, the IP address mobility attribute of the UE, and selecting a corresponding forwarding apparatus according to the IP address mobility attribute of the UE; and delivering, by the CCF, a forwarding rule to the selected forwarding apparatus, so that the forwarding apparatus processes, according to the forwarding rule, an IP packet that is corresponding to the mobility attribute and that is sent by the UE.

Correspondingly, step 11 that an IP address assignment apparatus sends an IP address and a mobility attribute of the IP address to UE may include:

Rreturning, by the CCF, an IP address response message to the UE, where the IP address response message includes the IP address and the mobility attribute of the IP address.

In this embodiment of the present invention, optionally, the IP address request message may be an attach request message or a PDN connection establishment request message, and the IP address response message may be an attach response message or a PDN connection establishment response message.

In this embodiment of the present invention, optionally, the IP address request message may be a DHCP request message or a router request, and the IP address response message may be a DHCP response message or a router advertisement message.

Further, after the CCF returns the DHCP response message or the router advertisement message to the UE, the method may further include:

The CCF sends a bearer setup request message to a base station, and sends a session management request message to the UE via the base station, where the session management request message includes traffic flow template TFT information;

the base station sends a bearer setup response message to the CCF; and transmitting, by the UE, an IP packet that matches the TFT information to the forwarding apparatus.

When the IP address assignment method provided in this embodiment of the present invention is applied to the network architecture in which the control plane is separated from the user plane, the IP address request message may include the mobility preference information of the UE. The CCF may determine the IP address mobility attribute of the UE according to the mobility preference information of the UE.

The IP address mobility attribute may include mobility provided and mobility not provided. The forwarding apparatus may include a first forwarding apparatus corresponding to mobility provided and a second forwarding apparatus corresponding to mobility not provided.

According to the IP address assignment method provided in this embodiment of the present invention, an IP address assignment protocol packet of the user plane is forwarded to the CCF (control plane). The CCF (control plane) is triggered to select a new forwarding apparatus (gateway forwarding plane) to assign an IP address. In this way, the UE can be simultaneously assigned two IP addresses with different mobility attributes by using one PDN connection. This avoids forcing the UE to support multiple PDN connections. In addition, a terminal that supports only a single PDN connection for assigning multiple IP addresses by using a user plane IP address assignment protocol is compatible.

Figure 2:
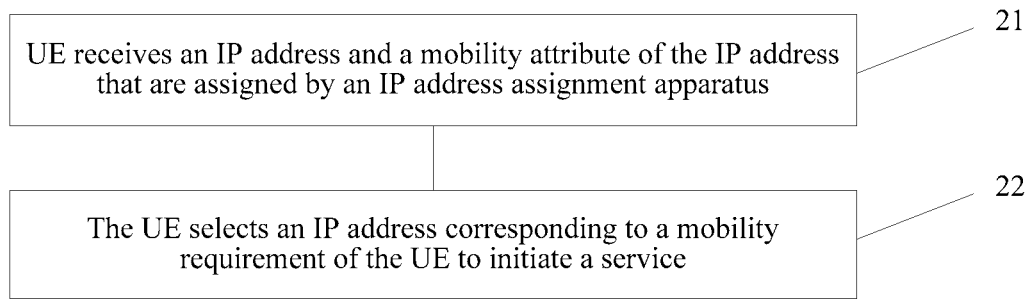
FIG. 2 is a flowchart of an IP address assignment method according to an embodiment of the present invention.

FIG. 2 is a flowchart of another IP address assignment method according to an embodiment of the present invention. Referring to FIG. 2, the IP address assignment method provided in this embodiment of the present invention may include:

21. Rreceiving, by the UE, an IP address and a mobility attribute of the IP address that are assigned by an IP address assignment apparatus.

22. Selecting, at the UE, an IP address corresponding to a mobility requirement of the UE to initiate a service.

The mobility attribute in accordance with the disclosure means that when a user moves, whether a network keeps the IP address unchanged, that is, session continuity. The mobility attribute in this application may include the following two attributes: mobility provided and mobility not provided. Certainly, there may be another classification manner. For example, the mobility attribute is classified into high (that is, corresponding to mobility provided) and low (that is, corresponding to mobility not provided). When mobility is provided or the mobility attribute is high, the IP address remains unchanged. That is, the session continuity is ensured. When the mobility attribute is low or mobility is not provided, the IP address is changed. That is, the session continuity is not ensured.

According to the IP address assignment method provided in this embodiment of the present invention, the IP address mobility attribute is general and inter-operator. Therefore, the UE does not need to separately maintain an APN meaning list for each operator, and only needs to record an assigned IP address and an attribute corresponding to the assigned IP address. This simplifies implementation on a mobile phone. When the mobile phone is connected to a new operator, only an IP address assignment process needs to be performed again to update the record, and additional update of an APN service list is unnecessary. This resolves the following problem: An IP address cannot be selected because an APN list in the related technology is not updated in time.

Optionally, in an embodiment in accordance with the present invention, the IP address assignment method provided in this embodiment of the present invention may be applied to an evolved packet system (EPS) network. In this case, before step 21: UE receives an IP address and a mobility attribute of the IP address that are assigned by an IP address assignment apparatus, in addition to the foregoing step 21 and step 22, the IP address assignment method provided in this embodiment of the present invention may further include:

Sending, by the UE, an attach request message or a PDN connection establishment request message to an MME; and Receiving, by the UE, an attach accept message or the PDN connection establishment request message returned by the MME via a base station, where the attach accept message or the PDN connection establishment request message includes the IP address and the mobility attribute of the IP address.

In this embodiment of the present invention, optionally, the attach request message includes mobility preference information of the UE, and/or the PDN connection establishment request message includes mobility preference information of the UE, so that the MME determines the mobility attribute according to the mobility preference information.

Optionally, in an embodiment of the present invention, the IP address assignment apparatus may include a first IP address assignment apparatus and a second IP address assignment apparatus. In this case, step 21 that UE receives an IP address and a mobility attribute of the IP address that are assigned by an IP address assignment apparatus includes:

receiving, by the UE, an IP address and a mobility attribute of the IP address that are assigned by the first IP address assignment apparatus and/or the second IP address assignment apparatus.

The mobility attribute of the IP address includes mobility provided and mobility not provided. Mobility provided is corresponding to the first IP address assignment apparatus. Mobility not provided is corresponding to the second IP address assignment apparatus.

In another embodiment in accordance with the present invention, the IP address assignment method provided in this embodiment of the present invention may be applied to a network architecture in which a control plane is separated from a user plane. In this network architecture, the IP address assignment apparatus is integrated into a CCF. In this case, before step 21: UE receives an IP address and a mobility attribute of the IP address that are assigned by an IP address assignment apparatus, the IP address assignment method provided in this embodiment of the present invention may further include:

Sending, by the UE, an IP address request message to the CCF; and

Receiving, by the UE, an IP address response message returned by the CCF, where the IP address response message includes the IP address and the mobility attribute of the IP address.

In this embodiment of the present invention, the IP address request message may include mobility preference information of the UE, so that the CCF determines the IP address mobility attribute of the UE according to the mobility preference information of the UE.

Optionally, the IP address request message may be an attach request message or a PDN connection establishment request message. The IP address response message may be an attach response message or a PDN connection establishment response message.

Optionally, the IP address request message may be a DHCP request message or a router request. The IP address response message may be a DHCP response message or a router advertisement message.

Optionally, when the IP address request message is a DHCP request message or a router request, and the IP address response message is a DHCP response message or a router advertisement message, after the UE receives the DHCP response message or the router advertisement message returned by the CCF, the method may further include:

receiving, by the UE, a session management request message, where the session management request message includes traffic flow template TFT information; and transmitting, by the UE, an IP packet that matches the TFT information.

According to the IP address assignment method provided in this embodiment of the present invention, an IP address assignment protocol packet of the user plane is forwarded to the CCF (control plane). The CCF (control plane) is triggered to select a new forwarding apparatus (gateway forwarding plane) to assign an IP address. In this way, the UE can be simultaneously assigned two IP addresses with different mobility attributes by using one PDN connection. This avoids forcing the UE to support multiple PDN connections. In addition, a terminal that supports only a single PDN connection for assigning multiple IP addresses by using a user plane IP address assignment protocol is compatible.

To better understand the technical solutions in the present invention, the following further explains the IP address assignment method provided in the present invention by using several specific embodiments.

Figure 3A:
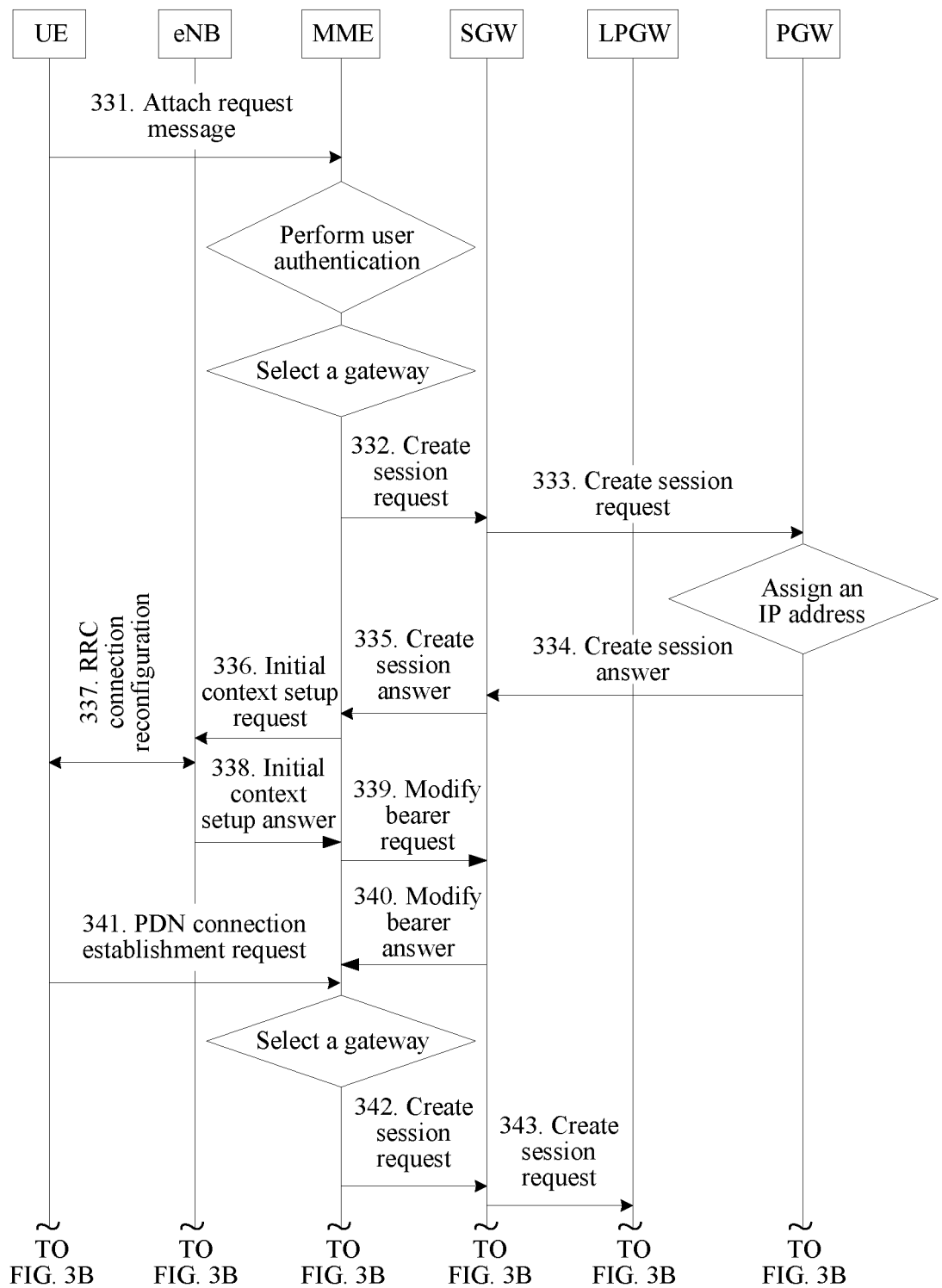
FIG. 3A and FIG. 3B are a schematic diagram of an IP address assignment method according to an embodiment of the present invention.
Figure 3B:
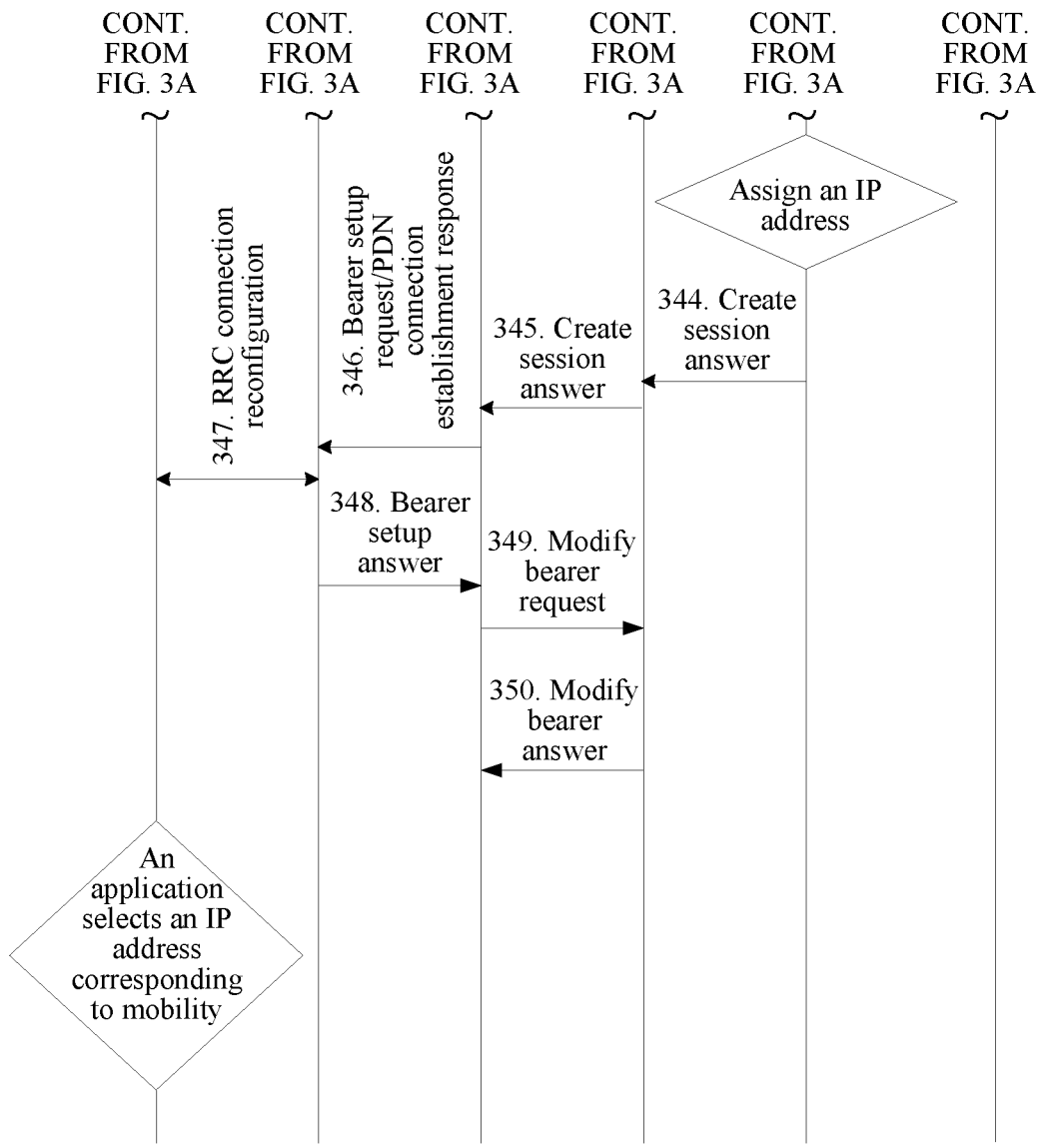

FIG. 3A and FIG. 3B are a schematic diagram of an IP address assignment method according to an embodiment of the present invention. Referring to FIG. 3A and FIG. 3B, the method may be applied to a conventional EPS network, and includes the following steps.

331. Sending, by the UE, an attach request message to an MME by using an eNB, where the attach request message may optionally include an IP address mobility attribute (may be carried by an extended PDN type parameter) preferred by the UE. For this embodiment, mobility provided is preferably carried.

332. Authenticating the UE by the MME. If authentication on the UE succeeds, the MME establishes a secure context with the UE. The attach request message does not include an encryption option transfer flag. Therefore, the MME selects a default APN from user subscription and an IP address mobility attribute preferred by the UE, and selects a gateway. If the UE does not include an IP address mobility attribute, the MME may select a gateway according to a default preferred IP address mobility attribute in the subscription. If the preferred IP address mobility attribute is high mobility and allowed by the subscription, a centrally-deployed gateway is selected to assign an IP address to the user. Otherwise, a distributively-deployed gateway is selected to assign an IP address to the user. The MME selects an SGW according to a selected packet gateway and a user location. It should be noted that if the UE prefers the high mobility, but the user subscription allows only low mobility, the MME selects a gateway by using the low mobility according to the subscription.

The MME sends a create session request message to the selected SGW. The create session request message includes information such as a PDN type, an APN, an international mobile subscriber identity (IMSI), a PGW address, and optionally includes a mobility attribute of an IP address.

333. Sending, by the MME, a create session request message to a PGW according to a PGW address in step 332. The create session request message includes information such as a PDN type, an APN, an IMSI, a tunnel endpoint identifier (TEID), and optionally includes a mobility attribute of an IP address.

334. Assigning, by the PGW, an IP address in a corresponding network according to the PDN type and the APN information, returns a create session response message to the SGW. The create session response message includes TEID information and an IP address that are assigned by the PGW, and a mobility attribute of the assigned IP address (the attribute may be carried by an extended PCO parameter). Because a deployment location of the gateway is relatively high, the mobility attribute of the IP address assigned by the gateway is high.

335. Returning, by the SGW, the create session response message to the MME.

336. Sending, by the MME, an initial context setup request message to the eNB, and returns an attach accept message to the UE via the base station. The attach accept message includes APN information, IP address information, and a mobility attribute of the IP address. In this case, the UE records the IP address and the mobility attribute corresponding to the IP address.

337. Reconfiguring an RRC connection between the eNB and the UE, so as to transmit a user plane packet.

338. Returning, by the eNB, an initial context setup response message to the MME, where the initial context setup response message includes a TEID assigned by the eNB, and the TEID is used to create a downlink forwarding tunnel between the SGW and the eNB.

339. Sending, by the MME, a modify bearer request message to the SGW, where the modify bearer request message includes the TEID assigned by the eNB.

340. Returning, by the SGW, a modify bearer response message. Afterward, the UE may send and receive an IP packet. If all applications on the UE need mobility support, that is, an IP address remains unchanged when a location is moved, the UE no longer initiates a subsequent process. If some applications on the UE need mobility support, and some do not need the mobility support and only visit a local service, the UE initiates a subsequent process.

341. Sending, by the UE, a PDN connection establishment request message to the MME by using the eNB. The PDN connection establishment request message may directly include the APN information (the same as the APN information returned to the UE in the foregoing step 336), and a preferred IP address mobility attribute (may be carried by the extended PDN type parameter). For this embodiment, the mobility attribute is low, that is, an IP address does not need to always remain unchanged.

342. Selecting, by the MME, a gateway (that still needs to be checked according to subscription) according to the IP address mobility attribute preferred by the UE and the APN that are carried in the message, and selects a corresponding local gateway for this example. The MME sends the create session request message to the selected SGW in step 332. The create session request message includes the information such as the PDN type, the APN, the IMSI, and a local gateway address.

343. Sending, by the SGW, a create session request message to the local gateway according to the PGW address in step 342. The create session request message includes information such as a PDN type, an APN, an IMSI, and a TEID, and optionally includes a preferred IP address mobility attribute.

344. Assigning, by the local gateway, an IP address in a corresponding network according to the PDN type and the APN information, returns a create session response message to the SGW. The create session response message includes TEID information and an IP address that are assigned by the local gateway, and a mobility attribute of the assigned IP address. The mobility attribute of the IP address assigned by the local gateway is low.

345. Returning, by the SGW, the create session response message to the MME.

346. Sending, by the MME, a bearer setup request message to the eNB, and returns a PDN connection establishment response message to the UE via the base station. The PDN connection establishment response message includes APN information, IP address information, and a mobility attribute of the IP address. In this case, the UE records the IP address and the mobility attribute corresponding to the IP address.

347. Reconfiguring an RRC connection between the eNB and the UE, so as to transmit a user plane packet.

348. returning, by the eNB, a bearer setup response message to the MME.

349. Sending, by the MM, the modify bearer request message to the SGW.

350. Returning, by the SGW, the modify bearer response message. In this case, the UE has two IP addresses. The application on the UE selects, according to a requirement of the application, different IP addresses to initiate a service.

It should be noted that an initiation sequence of the two APNs is not fixed. A network connection to the local gateway may be first initiated, and a network connection to the PGW may be initiated then.

For a problem that how an application on a mobile phone selects different IP addresses to initiate a service, a possible implementation is as follows. A mobile phone operating system saves a currently-connected APN and a corresponding IP address. Different operators have different APN names. For example, China Mobile may name an APN of a local service as A, and name an anchored APN as B; and China Unicom names an APN of a local service as X, and names an anchored APN as Y. Because the mobile phone may be connected to different operators, the mobile phone operating system needs to maintain APN lists of all operators and attributes corresponding to the APN lists. When an APP on the mobile phone initiates a service, the APP invokes an API provided by the operating system, to require an IP address with a specific attribute. For example, an APP1 may require an IP address to be unchanged. In this case, the mobile phone operating system returns, according to a currently-connected PLMN and an APN list corresponding to the PLMN, an IP address of a corresponding attribute required by the APP1. After obtaining the IP address with a specific attribute, the APP invokes an API provided by a socket, and initiates an IP service. The API may specify a source address required by the IP service. Another possible implementation further includes the following: An application maintains APN lists of all operators and attributes corresponding to the APN lists.

It can be learned from this embodiment that, an IP address mobility attribute is general and inter-operator, and therefore, a mobile phone operating system or an application does not need to separately maintain an APN meaning list for each operator, and only needs to record an assigned IP address and an attribute corresponding to the assigned IP address. This simplifies implementation on a terminal (for example, a mobile phone). When the terminal is connected to a new operator, only an IP address assignment process needs to be performed again to update the record, and additional update of an APN service list is unnecessary. This resolves the following problem: An IP address cannot be selected because an APN list in the prior art is not updated in time. In addition, a mobility attribute is provided by extending a socket programming interface. This can simplify implementation of a mobile phone application, and avoid additional processing caused because the mobile phone application selects a source IP address, thereby simplifying application implementation.

Figure 4:
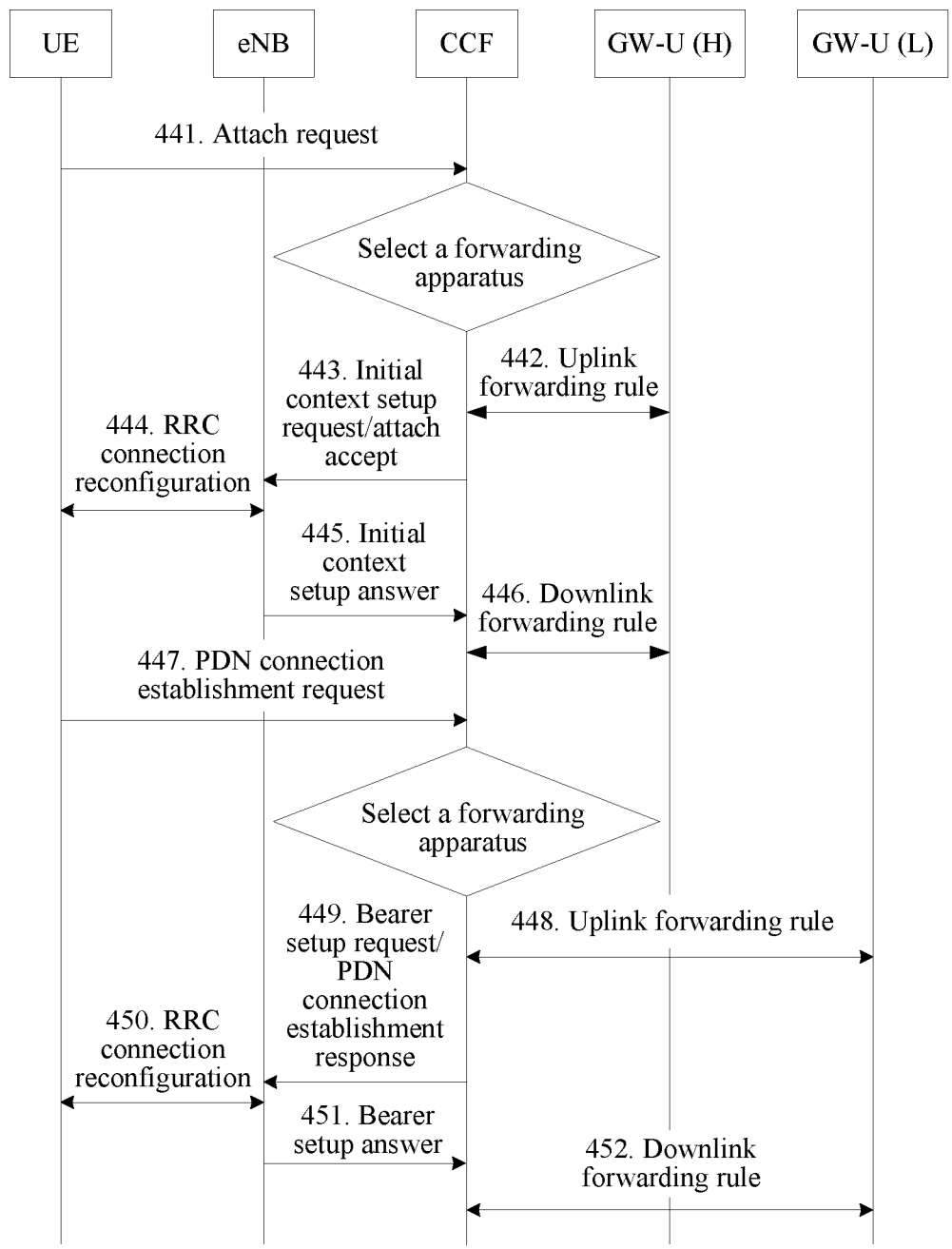
FIG. 4 is a schematic diagram of an IP address assignment method according to an embodiment of the present invention.

FIG. 4 is a schematic diagram of an IP address assignment method according to an embodiment of the present invention. Referring to FIG. 4, the method may be applied to a network architecture in which a control plane is separated from a user plane, and includes the following steps.

441. UE sends an attach request message to a CCF by using an eNB, where the attach request message optionally includes mobility preference information (may be carried by an extended PCO parameter) of the UE.

442. The CCF attempts to authenticate the UE. If authentication on the UE succeeds, the CCF establishes a secure context with the UE. The CCF does not include an encryption option transfer flag. Therefore, the CCF selects a default APN from user subscription and a preferred mobility attribute carried by the UE, and selects a corresponding forwarding apparatus (gateway forwarding plane). If the preferred IP address mobility attribute is high, a centrally-deployed forwarding apparatus (gateway forwarding plane) is selected. Otherwise, a distributively-deployed forwarding apparatus (gateway forwarding plane) is selected. After selecting a forwarding apparatus (gateway forwarding plane), the CCF assigns an IP address of a user, and delivers an uplink forwarding rule to the forwarding apparatus (gateway forwarding plane) to instruct the forwarding apparatus (gateway forwarding plane) how to process an IP packet sent by the UE.

443. The CCF sends an initial context setup request message that includes an assigned TEID to the eNB, and returns an attach accept message to the UE via the base station. The attach accept message includes an APN, an assigned IP address, and a mobility attribute corresponding to the address.

444. Reconfigure an RRC connection between the eNB and the UE, and establish a radio bearer, so as to transmit a user plane packet.

445. The eNB returns an initial context setup response message to the CCF, where the initial context setup response message includes a TEID assigned by the eNB.

446. The CCF delivers a downlink forwarding rule to the forwarding apparatus (gateway forwarding plane), so as to instruct the forwarding apparatus (gateway forwarding plane) how to process an IP packet to be sent to the UE. After receiving the IP packet to be sent to the UE, the forwarding apparatus encapsulates the TEID assigned by the eNB, and sends the IP packet to the base station. If all applications on the UE need mobility support, that is, an IP address remains unchanged when a location is moved, the UE no longer initiates a subsequent process. If some applications on the UE need mobility support, and some do not need the mobility support and only visit a local service, the UE initiates a subsequent process.

447. The UE sends a PDN connection establishment request message to the CCF by using the eNB. The PDN connection establishment request message may directly include APN information (the same as the APN information returned to the UE in the foregoing step 443), and an optional IP address mobility attribute.

448. According to the optional IP address mobility attribute in the PDN connection message, and user subscription information (whether an address of the type is allowed for assignment), the CCF selects a corresponding forwarding apparatus (gateway forwarding plane), and assigns an IP address 2 of the user. For this example, the CCF selects a forwarding apparatus (gateway forwarding plane) at a relatively low location (local). The CCF (gateway control plane) delivers the uplink forwarding rule to the forwarding apparatus (gateway forwarding plane) to instruct the forwarding apparatus (gateway forwarding plane) how to process the IP packet (a source address is the IP address 2) sent by the UE.

449. The CCF sends a bearer setup request message that includes a TEID assigned by the control plane to the eNB, and returns a PDN connection establishment response message to the UE via the base station. The PDN connection establishment response message includes APN information, IP address information, and a mobility attribute of the IP address.

450. Reconfigure an RRC connection between the eNB and the UE, and establish a radio bearer, so as to transmit a user plane packet.

451. The eNB returns a bearer setup response message to the CCF, where the bearer setup response message includes the TEID assigned by the eNB.

452. The CCF delivers the downlink forwarding rule to the forwarding apparatus (gateway forwarding plane), so as to instruct the forwarding apparatus (gateway forwarding plane) how to process the IP packet (a destination address is the IP address 2) sent to the UE. After receiving the IP packet to be sent to the UE, the forwarding apparatus encapsulates the TEID assigned by the eNB, and sends the IP packet to the base station. In this case, the UE has two IP addresses. The application on the UE selects, according to a requirement of the application, different IP addresses to initiate a service.

It can be learned from this embodiment that, an IP address mobility attribute is general and inter-operator, and therefore, a mobile phone operating system or an application does not need to separately maintain an APN meaning list for each operator, and only needs to record an assigned IP address and an attribute corresponding to the assigned IP address. This simplifies implementation on a mobile phone. When the mobile phone is connected to a new operator, only an IP address assignment process needs to be performed again to update the record, and additional update of an APN service list is unnecessary. This resolves the following problem: An IP address cannot be selected because an APN list in the prior art is not updated in time. In addition, a mobility attribute is provided by extending a socket programming interface. This can simplify implementation of a mobile phone application, and avoid additional processing caused because the mobile phone application selects a source IP address, thereby simplifying application implementation.

Figure 5:
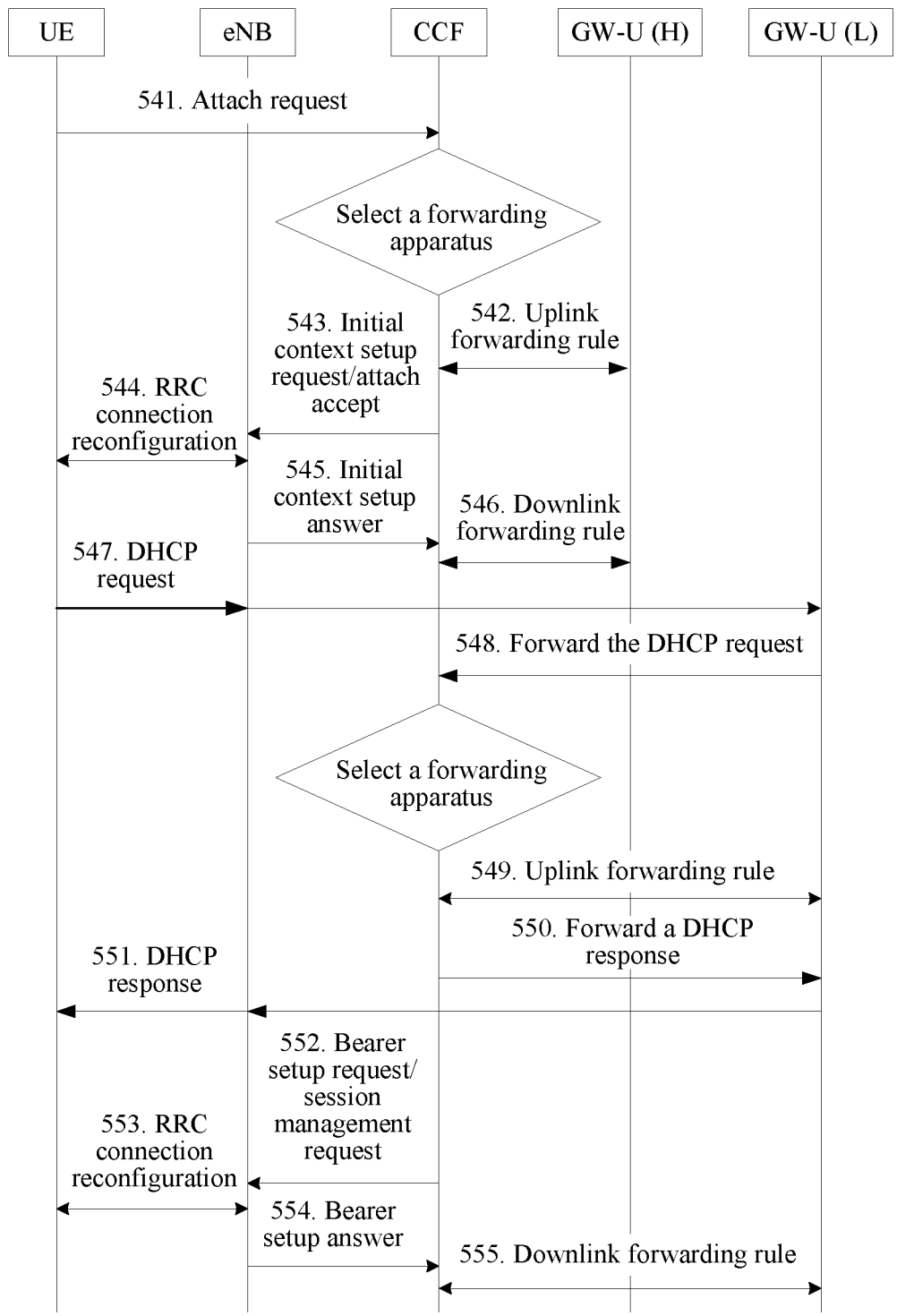
FIG. 5 is a schematic diagram of an IP address assignment method according to an embodiment of the present invention.

FIG. 5 is a schematic diagram of an IP address assignment method according to an embodiment of the present invention. Referring to FIG. 5, the method may be applied to a network architecture in which a control plane is separated from a user plane, and includes the following steps.

541. UE sends an attach request message to a CCF by using an eNB, where the attach request message optionally includes mobility preference information of the UE.

542. The CCF attempts to authenticate the UE. If authentication on the UE succeeds, the CCF establishes a secure context with the UE. The CCF neither includes an encryption option transfer flag nor includes a preferred IP address mobility attribute. Therefore, the CCF selects a default APN from user subscription and a default IP address mobility attribute, and selects a corresponding forwarding apparatus (gateway forwarding plane). After selecting the forwarding apparatus (gateway forwarding plane), the CCF assigns an IP address 1 of a user, and delivers an uplink forwarding rule to the forwarding apparatus (gateway forwarding plane), so as to instruct the gateway forwarding plane how to process an IP packet sent by the UE. It should be indicated in the uplink forwarding rule that after detecting a DHCP message or an IPv6 stateless address autoconfiguration protocol message, the gateway forwarding plane needs to report the message to the CCF (control plane).

543. The CCF sends an initial context setup request message that includes a TEID assigned by the control plane to the eNB, and returns an attach accept message to the UE via the base station. The attach accept message includes an APN, an assigned IP address, and a mobility attribute corresponding to the address.

544. Reconfigure an RRC connection between the eNB and the UE, and establish a radio bearer, so as to transmit a user plane packet.

545. The eNB returns an initial context setup response message to the CCF, where the initial context setup response message includes a TEID assigned by the eNB.

546. The CCF delivers a downlink forwarding rule to the gateway forwarding plane, so as to instruct the gateway forwarding plane how to process an IP packet to be sent to the UE. After receiving the IP packet to be sent to the UE, the gateway forwarding plane encapsulates the TEID assigned by the eNB, and sends the IP packet to the base station. If all applications on the UE need mobility support, that is, an IP address remains unchanged when a location is moved, the UE no longer initiates a subsequent process. If some applications on the UE need mobility support, and some do not need the mobility support and only visit a local service, the UE initiates a subsequent process.

547. The UE initiates an additional address assignment process (the DHCP or the IPv6 stateless address autoconfiguration protocol) in the user plane, where the additional address assignment process includes an IP address attribute preferred by the UE, for example, low mobility in this example.

548. After receiving the DHCP packet or the IPv6 stateless address autoconfiguration protocol packet, the forwarding apparatus (gateway forwarding plane) sends the packet to the CCF according to the uplink forwarding rule in step 542.

549. According to the preferred IP address attribute in the reported packet, and user subscription information (whether an address of the type is allowed for assignment), the CCF selects a corresponding forwarding apparatus (gateway forwarding plane), and assigns an IP address 2 of the user. For this example, the CCF selects a gateway forwarding plane at a relatively low location (local). The CCF (gateway control plane) delivers the uplink forwarding rule to the forwarding apparatus (gateway forwarding plane) to instruct the forwarding apparatus (gateway forwarding plane) how to process the IP packet (a source address is the IP address 2) sent by the UE.

550. The CCF encapsulates a DHCP response packet or an IPv6 stateless address autoconfiguration protocol response packet, and sends the packet to the forwarding apparatus (gateway forwarding plane).

551. The forwarding apparatus (gateway forwarding plane) sends the DHCP response packet or the IPv6 stateless address autoconfiguration protocol response packet to the UE by using the user plane. The packet includes an assigned IP address and a mobility attribute corresponding to the address.

552. The CCF sends a bearer setup request message that includes an assigned TEID to the eNB, sends a session management request message that includes TFT information to the UE via the base station, and instructs the UE to send, on the bearer, a packet whose source address is the IP address 2.

553. Reconfigure an RRC connection between the eNB and the UE, and establish a radio bearer, so as to transmit a user plane packet.

554. The eNB returns a bearer setup response message to the CCF, where the bearer setup response message includes the TEID assigned by the eNB.

555. The CCF delivers the downlink forwarding rule to the forwarding apparatus (gateway forwarding plane), so as to instruct the forwarding apparatus (gateway forwarding plane) how to process the IP packet (a destination address is the IP address 2) sent to the UE. After receiving the IP packet to be sent to the UE, the forwarding apparatus encapsulates the TEID assigned by the eNB, and sends the IP packet to the base station. In this case, the UE has two IP addresses. The application on the UE selects, according to a requirement of the application, different IP addresses to initiate a service.

This embodiment has an effect owned by the embodiment shown in FIG. 3A and FIG. 3B. In addition, by using programmability of the forwarding apparatus (gateway forwarding plane), an IP address assignment protocol packet of the user plane is forwarded to the CCF (control plane), and the CCF is triggered to select a new forwarding apparatus (gateway forwarding plane) to assign an IP address. In this way, the UE can be simultaneously assigned two IP addresses with different mobility attributes by using one PDN connection. This avoids forcing the UE to support multiple PDN connections. In addition, a terminal that supports only a single PDN connection for assigning multiple IP addresses by using a user plane IP address assignment protocol is compatible.

Figure 6A:
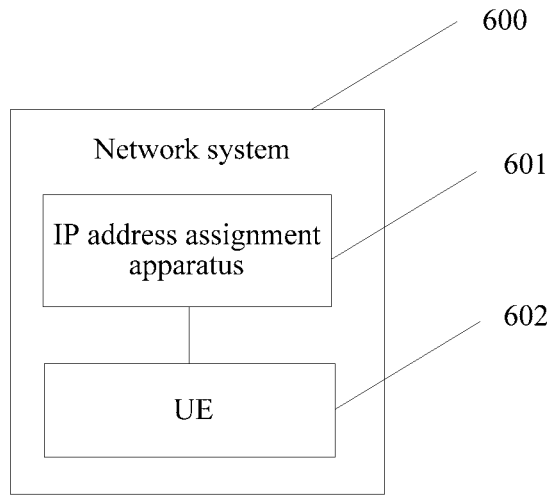
FIG. 6A is a structural block diagram of a network system according to an embodiment of the present invention.

FIG. 6A shows a network system for IP address assignment according to an embodiment of the present invention. Referring to FIG. 6A, a network system 600 provided in this embodiment of the present invention may include an IP address assignment apparatus 601 and UE 602.

The IP address assignment apparatus 601 is configured to send an IP address and a mobility attribute of the IP address to the UE.

The UE 602 is configured to select, from the IP address of the IP address assignment apparatus, an IP address corresponding to a mobility requirement of the UE to initiate a service.

According to the network system for IP address assignment provided in this embodiment of the present invention, the IP address mobility attribute is general and inter-operator. Therefore, the UE does not need to separately maintain an APN meaning list for each operator, and only needs to record an assigned IP address and an attribute corresponding to the assigned IP address. This simplifies implementation on a mobile phone. When the mobile phone is connected to a new operator, only an IP address assignment process needs to be performed again to update the record, and additional update of an APN service list is unnecessary. This resolves the following problem: An IP address cannot be selected because an APN list in the related technology is not updated in time.

Figure 6B:
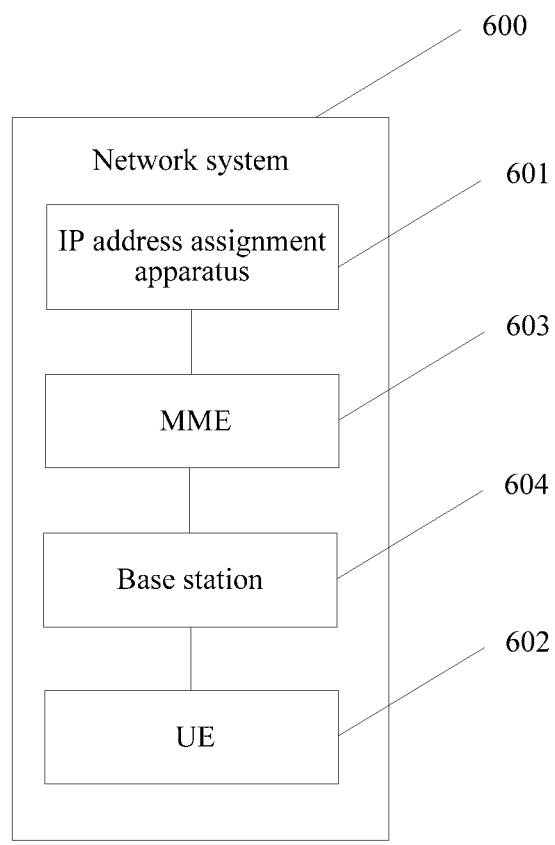
FIG. 6B is a structural block diagram of another network system according to an embodiment of the present invention.

Optionally, in an embodiment of the present invention, referring to FIG. 6B, the network system 600 further includes an MME 603 and a base station 604.

Before the IP address assignment apparatus 601 sends the IP address and the mobility attribute of the IP address to the UE 602, the UE 602 is further configured to send an attach request message or a PDN connection establishment request message to the MME 603.

The MME 603 is configured to: determine an IP address mobility attribute of the UE 602 based on the attach request message or the PDN connection establishment request message, select an IP address assignment apparatus corresponding to the IP address mobility attribute, and send a create session request message to the IP address assignment apparatus.

The IP address assignment apparatus 601 is specifically configured to:

after receiving the create session request message from the MME, send a create session response message to the MME, where the create session response message includes the IP address and the mobility attribute of the IP address.

The MME 603 is further configured to return an attach accept message or the PDN connection establishment request message to the UE via the base station, where the attach accept message or the PDN connection establishment request includes the IP address and the mobility attribute of the IP address.

Optionally, the attach request message includes mobility preference information of the UE, and/or the PDN connection establishment request message includes mobility preference information of the UE.

The MME is further configured to determine the mobility attribute according to the mobility preference information.

Optionally, the IP address assignment apparatus is a PGW, and an IP address mobility attribute corresponding to the PGW is mobility provided. Alternatively, the IP address assignment apparatus is an LPGW, and an IP address mobility attribute corresponding to the LPGW is mobility not provided.

In another embodiment of the present invention, optionally, the IP address assignment apparatus 601 is integrated into a converged control function CCF.

Before the IP address assignment apparatus 601 sends the IP address and the mobility attribute of the IP address to the UE 602, the UE 602 is further configured to send an IP address request message to the CCF. The CCF is configured to: determine an IP address mobility attribute of the UE, and select a corresponding forwarding apparatus according to the IP address mobility attribute of the UE.

The CCF is further configured to deliver a forwarding rule to the selected forwarding apparatus, so that the forwarding apparatus processes, according to the forwarding rule, an IP packet that is corresponding to the mobility attribute and that is sent by the UE.

The IP address assignment apparatus is specifically configured to:

return an IP address response message to the UE, where the IP address response message includes the IP address and the mobility attribute of the IP address.

Optionally, the IP address request message is an attach request message or a PDN connection establishment request message. The IP address response message is an attach response message or a PDN connection establishment response message.

Optionally, the IP address request message is a DHCP request message or a router request. The IP address response message is a DHCP response message or a router advertisement message.

Optionally, in an embodiment of the present invention, after the CCF returns the DHCP response message or the router advertisement message to the UE, the CCF is further configured to send a bearer setup request message to the base station 604, and send a session management request message to the UE 602 via the base station 604. The session management request message includes traffic flow template TFT information.

The base station 604 sends a bearer setup response message to the CCF.

The UE 602 transmits an IP packet that matches the TFT information to the forwarding apparatus.

Optionally, the IP address request message includes mobility preference information of the UE.

The CCF is further configured to determine the IP address mobility attribute of the UE according to the mobility preference information of the UE 602.

Optionally, the IP address mobility attribute includes mobility provided and mobility not provided. The forwarding apparatus includes a first forwarding apparatus corresponding to mobility provided and a second forwarding apparatus corresponding to mobility not provided.

In this embodiment of the present invention, a mobility attribute is specified when an IP address is assigned, so that a terminal application can select, according to a mobility requirement of the terminal application, different source IP addresses to transmit a service packet, thereby avoiding a problem that the terminal needs to adapt to different operators due to a use of multiple APNs, and simplifying a mechanism for selecting a source address by the terminal application.

Figure 7A:
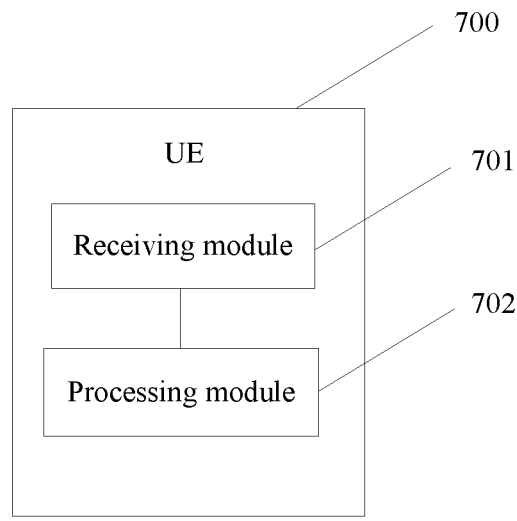
FIG. 7A is a structural block diagram of user equipment (UE) according to an embodiment of the present invention.

FIG. 7A is a structural block diagram of a user equipment UE according to an embodiment of the present invention. Referring to FIG. 7A, UE 700 provided in this embodiment of the present invention includes a receiving module 701 and a processing module 702.

The receiving module 701 is configured to receive an IP address and a mobility attribute of the IP address that are assigned by an IP address assignment apparatus.

The processing module 702 is configured to select an IP address corresponding to a mobility requirement of the UE to initiate a service.

According to the UE provided in this embodiment of the present invention, the IP address mobility attribute is general and inter-operator. Therefore, the UE does not need to separately maintain an APN meaning list for each operator, and only needs to record an assigned IP address and an attribute corresponding to the assigned IP address. This simplifies implementation. When the UE is connected to a new operator, only an IP address assignment process needs to be performed again to update the record, and additional update of an APN service list is unnecessary. This resolves the following problem: An IP address cannot be selected because an APN list in the related technology is not updated in time.

Figure 7B:
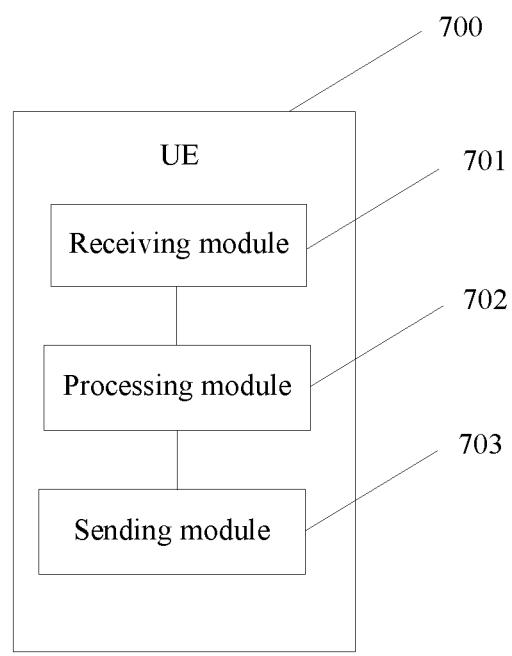
FIG. 7B is a structural block diagram of another UE according to an embodiment of the present invention.

Optionally, in an embodiment of the present invention, referring to FIG. 7B, the UE 700 may further include a sending module 703. Before the receiving module 701 receives the IP address and the mobility attribute of the IP address that are assigned by the IP address assignment apparatus, the sending module 703 is configured to send an attach request message or a PDN connection establishment request message to an MME.

The receiving module 701 is further configured to receive an attach accept message or the PDN connection establishment request message returned by the MME via a base station. The attach accept message or the PDN connection establishment request message includes the IP address and the mobility attribute of the IP address.

The attach request message may include mobility preference information of the UE, and/or the PDN connection establishment request message may include mobility preference information of the UE, so that the MME determines the mobility attribute according to the mobility preference information.

Optionally, in an embodiment of the present invention, the IP address assignment apparatus includes a first IP address assignment apparatus and a second IP address assignment apparatus. The receiving module 701 is specifically configured to:

receive an IP address and a mobility attribute of the IP address that are assigned by the first IP address assignment apparatus and/or the second IP address assignment apparatus.

The mobility attribute of the IP address includes mobility provided and mobility not provided. Mobility provided is corresponding to the first IP address assignment apparatus. Mobility not provided is corresponding to the second IP address assignment apparatus.

Optionally, in an embodiment of the present invention, the IP address assignment apparatus is integrated into a converged control function CCF.

Before the receiving module 701 receives the IP address and the mobility attribute of the IP address that are assigned by the IP address assignment apparatus, the sending module 703 is further configured to send an IP address request message to the CCF.

The receiving module 701 is configured to receive an IP address response message returned by the CCF. The IP address response message includes the IP address and the mobility attribute of the P address.

Optionally, the IP address request message is an attach request message or a PDN connection establishment request message. The IP address response message is an attach response message or a PDN connection establishment response message.

Optionally, the IP address request message is a DHCP request message or a router request. The IP address response message is a DHCP response message or a router advertisement message.

Optionally, after the receiving module receives the DHCP response message or the router advertisement message returned by the CCF, the receiving module 701 is further configured to receive a session management request message. The session management request message includes traffic flow template TFT information.

The sending module 703 is further configured to transmit an IP packet that matches the TFT information.

Optionally, the IP address request message includes mobility preference information of the UE, so that the CCF determines the IP address mobility attribute of the UE according to the mobility preference information of the UE.

In this embodiment of the present invention, a mobility attribute is specified when an IP address is assigned, so that a terminal application can select, according to a mobility requirement of the terminal application, different source IP addresses to transmit a service packet, thereby avoiding a problem that the terminal needs to adapt to different operators due to a use of multiple APNs, and simplifying a mechanism for selecting a source address by the terminal application.

It should be noted that an embodiment of the present invention may further provide another UE, and the UE includes a processor and a receiver.

The receiver is configured to receive an IP address and a mobility attribute of the IP address that are assigned by an IP address assignment apparatus.

The processor is configured to select an IP address corresponding to a mobility requirement of the UE to initiate a service.

Optionally, the UE further includes a transmitter. Before the receiver receives the IP address and the mobility attribute of the IP address that are assigned by the IP address assignment apparatus, the transmitter is configured to send an attach request message or a PDN connection establishment request message to an MME.

The receiver is further configured to receive an attach accept message or the PDN connection establishment request message returned by the MME via a base station. The attach accept message or the PDN connection establishment request message includes the IP address and the mobility attribute of the IP address.

Optionally, the attach request message includes mobility preference information of the UE, and/or the PDN connection establishment request message includes mobility preference information of the UE, so that the MME determines the mobility attribute according to the mobility preference information.

Optionally, the IP address assignment apparatus includes a first IP address assignment apparatus and a second IP address assignment apparatus.

The receiver is specifically configured to:

receive an IP address and a mobility attribute of the IP address that are assigned by the first IP address assignment apparatus and/or the second IP address assignment apparatus.

The mobility attribute of the IP address includes mobility provided and mobility not provided. Mobility provided is corresponding to the first IP address assignment apparatus. Mobility not provided is corresponding to the second IP address assignment apparatus.

Optionally, the IP address assignment apparatus is integrated into a converged control function CCF. Before the receiver receives the IP address and the mobility attribute of the IP address that are assigned by the IP address assignment apparatus, the transmitter is further configured to send an IP address request message to the CCF.

The receiver is configured to receive an IP address response message returned by the CCF. The IP address response message includes the IP address and the mobility attribute of the P address.

Optionally, the IP address request message is an attach request message or a PDN connection establishment request message. The IP address response message is an attach response message or a PDN connection establishment response message.

Optionally, the IP address request message is a DHCP request message or a router request. The IP address response message is a DHCP response message or a router advertisement message.

Optionally, after the receiver receives the DHCP response message or the router advertisement message returned by the CCF, the receiver is further configured to receive a session management request message. The session management request message includes traffic flow template TFT information.

The transmitter is further configured to transmit an IP packet that matches the TFT information.

Optionally, the IP address request message includes mobility preference information of the UE, so that the CCF determines the IP address mobility attribute of the UE according to the mobility preference information of the UE.

According to the UE provided in this embodiment of the present invention, a terminal can more easily and conveniently select a proper IP address to initiate a service, thereby avoiding a problem that the terminal needs to adapt to different operators due to APN list maintenance.

It should be noted that the UE provided in the foregoing embodiments is described only by using division of the foregoing functional modules as an example. In practice, the functions may be assigned to different functional modules for implementation as required. To be specific, an internal structure of an apparatus is divided into different functional modules to implement all or part of the functions described above. In addition, the IP address assignment apparatus provided in the foregoing embodiment pertains to a same concept as the IP address assignment method embodiments. For a specific implementation process of the IP address assignment apparatus, refer to the method embodiments, and details are not described herein.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. An Internet Protocol (IP) address assignment method, comprising:
    receiving, by a control plane device, an IP address request message from a user equipment (UE);
    if the IP address request message does not comprise information regarding a session continuity, selecting, by the control plane device, a forwarding apparatus according to default session continuity of the UE in subscription information, wherein the session continuity indicates whether an IP address is kept unchanged or not;
    assigning, by the control plane device, an IP address to the UE according to the default session continuity;
    delivering, by the control plane device, an uplink forwarding rule to the selected forwarding apparatus, wherein the uplink forwarding rule indicates how to process an uplink IP packet of the UE corresponding to the default session continuity;
    returning, by the control plane device through a base station, an IP address response message to the UE, wherein the IP address response message includes the IP address and information regarding the default session continuity;
    receiving, by the control plane device from the base station, a tunnel endpoint identifier (TEID) assigned by the base station; and
    delivering, by the control plane device, a downlink forwarding rule to the selected forwarding apparatus, wherein the downlink forwarding rule indicates encapsulating a downlink IP packet of the UE corresponding to the default session continuity using the TEID.

2. The method according to claim 1, wherein the IP address request message is a packet data network (PDN) connection establishment request message, and the IP address response message is a PDN connection establishment response message.

3. The method according to claim 1, wherein when the session continuity indicates the IP address is kept unchanged, the forwarding apparatus is a first forwarding apparatus corresponding to the IP address that is kept unchanged.

4. The method according to claim 1, wherein when the session continuity indicates the IP address is changed, the forwarding apparatus is a second forwarding apparatus corresponding to the IP address that is changed.

5. The method according to claim 1, wherein the uplink forwarding rule further indicates that after detecting an additional address assignment process (DHCP) message from the UE, the forwarding apparatus reporting the DHCP message to the control plane device.

6. The method according to claim 5, further comprising:
    receiving, by the forwarding apparatus, the DHCP message from the UE, wherein the DHCP message comprises information regarding a UE preferred session continuity;
    sending, by the forwarding apparatus according to the uplink forwarding rule, the DHCP message to the control plane device;
    selecting, by the control plane device, another forwarding apparatus according to the UE preferred session continuity;
    assigning, by the control plane device, another IP address to the UE according to the UE preferred session continuity; and
    sending, by the control plane device, a DHCP response message to the UE, wherein the DHCP response comprises the another IP address corresponding to the UE preferred session continuity.

7. An apparatus comprising a memory and at least one processor, wherein the memory is configured to store one or more instructions, which when executed by the at least one processor, cause apparatus to:
    receive an IP address request message from a user equipment (UE);
    if the IP address request message does not comprise information regarding a session continuity, select a forwarding apparatus according to default session continuity of the UE in subscription information, wherein the session continuity indicates whether an IP address is kept unchanged or not;
    assign an IP address to the UE according to the default session continuity;
    deliver an uplink forwarding rule to the forwarding apparatus, the uplink forwarding rule indicating how to process an uplink IP packet of the UE corresponding to the default session continuity;
    return an IP address response message to the UE through a base station, the IP address response message includes the IP address and information regarding the default session continuity;
    receive, from the base station, a tunnel endpoint identifier (TEID) assigned by the base station; and
    deliver a downlink forwarding rule to the selected forwarding apparatus, wherein the downlink forwarding rule indicates encapsulating a downlink IP packet of the UE corresponding to the default session continuity using the TEID.

8. The apparatus according to claim 7, wherein the IP address request message is a packet data network (PDN) connection establishment request message, and the IP address response message is a PDN connection establishment response message.

9. The apparatus according to claim 7, wherein when the session continuity indicates the IP address is kept unchanged, the forwarding apparatus is a first forwarding apparatus corresponding to the IP address that is kept unchanged.

10. The apparatus according to claim 7, wherein when the session continuity indicates the IP address is changed, the forwarding apparatus is a second forwarding apparatus corresponding to the IP address is changed.

11. The apparatus according to claim 7, wherein the uplink forwarding rule further indicates that after detecting an additional address assignment process (DHCP) message from the UE, the forwarding apparatus reporting the DHCP message to the control plane device.

12. A communication system, comprising a control plane apparatus and a forwarding apparatus,
    wherein the control plane apparatus is configured to:
        receive an IP address request message from a user equipment (UE);

if the IP address request message does not comprise information regarding a session continuity, select a forwarding apparatus according to default session continuity of the UE in subscription information, wherein the session continuity indicates whether an IP address is kept unchanged or not;

assign an IP address to the UE according to the default session continuity;

deliver an uplink forwarding rule to the forwarding apparatus, the uplink forwarding rule indicating how to process an uplink IP packet of the UE corresponding to the default session continuity; and return an IP address response message to the UE through a base station, wherein the IP address response message includes the IP address and information regarding the default session continuity;

receive, from the base station, a tunnel endpoint identifier (TEID) assigned by the base station;

deliver a downlink forwarding rule to the selected forwarding apparatus, wherein the downlink forwarding rule indicates encapsulating a downlink IP packet of the UE corresponding to the default session continuity using the TEID; and the forwarding apparatus is configured to:
receive the downlink forwarding rule and the downlink IP packet of the UE corresponding to the default session continuity;
encapsulate the downlink IP packet using the TEID; and
send the encapsulated downlink IP packet to the base station.

13. The communication system according to claim 12, wherein the IP address request message is a packet data network (PDN) connection establishment request message, and the IP address response message is a PDN connection establishment response message.

14. The communication system according to claim 12, wherein when the session continuity indicates the IP address is kept unchanged, the forwarding apparatus is a first forwarding apparatus corresponding to the IP address that is kept unchanged.

15. The communication system according to claim 12, wherein when the session continuity indicates the IP address is changed, the forwarding apparatus is a second forwarding apparatus corresponding to the IP address is changed.

16. The system according to claim 12, wherein the uplink forwarding rule further indicates that after detecting an additional address assignment process (DHCP) message from the UE, the forwarding apparatus reporting the DHCP message to the control plane device.

17. The system according to claim 16, wherein the forwarding apparatus is further configured to:
receive the DHCP message from the UE, wherein the DHCP message comprises information regarding a UE preferred session continuity; and
send, according to the uplink forwarding rule, the DHCP message to the control plane device;

the control plane device is further configured to:
select another forwarding apparatus according to the UE preferred session continuity;
assign another IP address to the UE according to the UE preferred session continuity; and
send a DHCP response message to the UE, wherein the DHCP response comprises the another IP address corresponding to the UE preferred session continuity.

* * * * *